United States Patent [19]
Collier

[11] Patent Number: 4,705,022
[45] Date of Patent: Nov. 10, 1987

[54] RECUPERATIVE RADIANT TUBE HEATING SYSTEM

[75] Inventor: David W. Collier, Milwaukee, Wis.

[73] Assignee: Eclipse, Inc., Rockford, Ill.

[21] Appl. No.: 911,971

[22] Filed: Sep. 25, 1986

[51] Int. Cl.⁴ ............................................. F24C 3/00
[52] U.S. Cl. .................... 126/91 A; 431/215; 431/353
[58] Field of Search ............ 126/91 A, 91; 431/9, 431/215, 353; 432/209, 223

[56] References Cited

U.S. PATENT DOCUMENTS

| | | | |
|---|---|---|---|
| 3,262,484 | 7/1966 | Hess | 431/215 X |
| 3,361,185 | 1/1968 | Anderson et al. | 126/91 A |
| 3,688,760 | 9/1972 | Rudin | 126/91 A |
| 4,304,549 | 12/1981 | Pfan | 432/215 |
| 4,310,303 | 1/1982 | Collier | 432/209 |
| 4,401,099 | 8/1983 | Collier | 126/91 |
| 4,629,414 | 12/1986 | Buschulte et al. | 431/353 X |

FOREIGN PATENT DOCUMENTS 221206 10/1961 Austria .......................... 126/91 A Primary Examiner—Larry Jones
Attorney, Agent, or Firm—Leydig, Voit & Mayer, Ltd.

[57] ABSTRACT

A recuperative radiant tube heating system in which a recuperator tube telescoped into a radiant tube and over a burner assembly is formed as three interconnected sections to facilitate manufacture of the recuperator tube, to facilitate assembly of the recuperator tube with the burner head of the burner assembly and to enable easy replacement of that portion of the recuperator tube which is most susceptible to burn out. The burner head includes a nozzle having gas discharge ports which are angled in such a manner as to effect good mixing of the gas with combustion air while reducing the likelihood of the ports becoming clogged with carbon.

5 Claims, 4 Drawing Figures

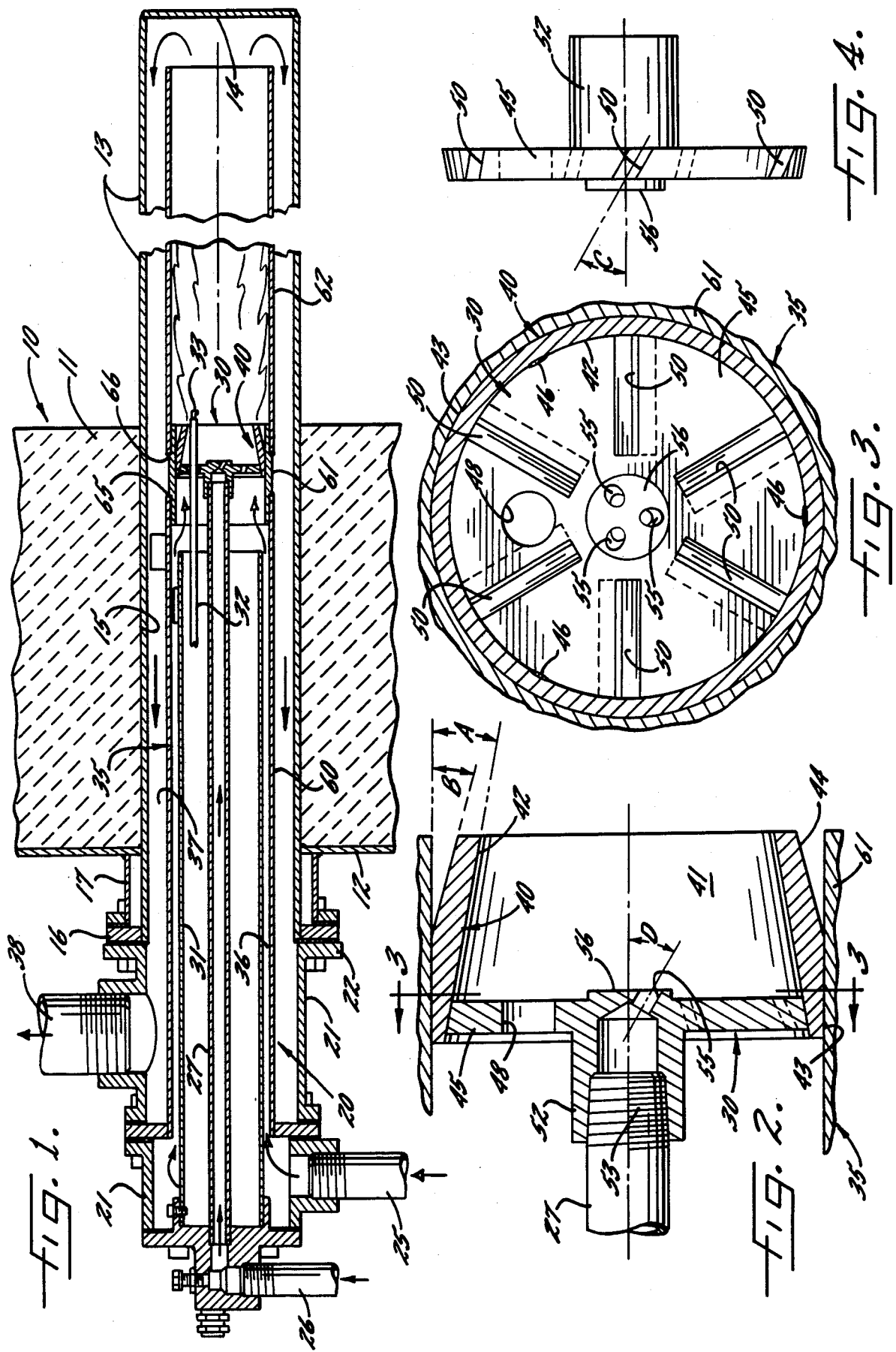

RECUPERATIVE RADIANT TUBE HEATING SYSTEM

BACKGROUND OF THE INVENTION

This invention relates generally to a burner assembly and, more particularly, to a burner assembly for use in a recuperative radiant tube heating system of the single-ended type. A single-ended recuperative (SER) radiant tube heating system is disclosed in Collier U.S. Pat. No. 4,401,099.

In general, such a system comprises an outer heat-resistant radiant tube having a closed forward end. Located within the outer radiant tube is an elongated recuperator tube which coacts with the radiant tube to define an annular exhaust passage for the flow of hot exhaust gases produced by a burner assembly. The latter includes a burner head which is supplied with gaseous fuel by way of a gas supply pipe. An inner tube is telescoped over the gas supply pipe and into the recuperator tube and coacts with the recuperator tube to define an annular passage for the flow of combustion air to the burner head.

In operation, gaseous fuel and combustion air are supplied to the burner head and are mixed therein to produce an intense flame which shoots along the forward end portion of the recuperator tube to heat the latter and the radiant tube. Exhaust gases discharged from the forward end of the recuperator tube strike the closed end of the radiant tube and flow reversely in the annular passage between the two tubes in order to further heat the radiant tube and also to preheat the combustion air flowing toward the burner head.

SUMMARY OF THE INVENTION

One of the aims of the present invention is to provide a new and improved system of the above general type in which the recuperator tube is uniquely constructed as three separate sections in order to facilitate manufacture of the tube and assembly thereof with the burner head and also to enable comparatively easy and economical replacement of that portion of the tube which experiences the highest temperatures and which is subject to the greatest burn-out.

Another object of the invention is to provide a novel burner head which fits closely within the recuperator tube and which is constructed in a novel manner to thoroughly mix the fuel and air and produce uniform progressive combustion down the tube. The thorough mixing effected by the burner head reduces hot spots along the tube and, at the same time, reduces the danger of the burner head becoming clogged with carbon.

The invention also resides in the unique arrangement of air and fuel passages in the burner head along with the coaction of such passages with a surrounding cone which fits closely within the recuperator tube to contract the fuel/air mixture into a converging stream.

These and other objects and advantages of the invention will become more apparent from the following detailed description when taken in conjunction with the accompanying drawings.

BRIEF DESCRIPTION OF THE DRAWINGS

FIG. 1 is a fragmentary cross-section taken longitudinally through a new and improved radiant tube heating system incorporating the unique features of the present invention and shows the system installed in a typical furnace.

FIG. 2 is an enlarged view primarily illustrating the burner head of the burner assembly shown in FIG. 1.

FIG. 3 is a fragmentary cross-section taken substantially along the line 3—3 of FIG. 2.

FIG. 4 is a side elevational view of part of the burner head.

DETAILED DESCRIPTION OF THE PREFERRED EMBODIMENT

For purposes of illustration, the invention has been shown in the drawings in conjunction with a radiant tube heating system of the type which is conventionally used to heat the chamber of a furnace such as a heat treating furnace. One wall 10 of a furnace is shown in FIG. 1 and is typically made of refractory material 11 whose outer side is covered by a metal skin 12.

The heating system includes an elongated radiant tube 13 disposed within the furnace chamber and made of ceramic or other suitable heat-resistant material. The forward or downstream end of the radiant tube is closed as indicated at 14.

The radiant tube 13 extends through a hole 15 in the furnace wall 10 and includes a mounting flange 16 which is secured rigidly to a mounting sleeve 17 on the outer side of the wall. A burner assembly 20 is secured to and is partially disposed in the radiant tube and is operable to produce a high temperature flame for heating the furnace. Herein, the burner assembly includes an outer housing 21 having a mounting flange 22 which is releasably secured to the mounting flange 16 of the radiant tube 13. A combustion air pipe 25 extends into one side of the housing and communicates with a blower (not shown) or other means for producing a flow of forced combustion air. Also connected into the housing is a gas supply line 26 which communicates with an elongated gas pipe 27. The latter extends down the center of the radiant tube 13 and supports a burner head 30 on its forward or downstream end. The burner head is adapted to receive gas and combustion air and to mix the two together.

Telescoped over and spaced radially from the gas pipe 27 is an inner tube 31 (FIG. 1) whose rear end is secured rigidly to the housing 21 and whose forward end terminates a substantial distance short of the burner head 30. An elongated spark rod 32 extends through the tube 31 and the burner head and includes an electrode 33 which is positioned just downstream of the burner head in order to ignite the fuel/air mixture discharged therefrom.

The overall burner assembly 20 is completed by an elongated recuperator tube 35 whose rear or upstream end is connected to the burner housing 21 in such a manner as to enable the tube 35 to communicate with the combustion air line 25. As shown in FIG. 1, the recuperator tube 35 is spaced radially outwardly from the inner tube 31 and coacts therewith to define an annular passage 36 accommodating the flow of combustion air to the burner head 30 and establishing a flow of relatively high velocity. The recuperator tube 35 extends well past the burner head and its forward end is spaced just upstream from the closed end 14 of the radiant tube 13. An annular passage 37 is defined between the radiant tube 13 and the recuperator tube 35 and permits exhaust gases to flow reversely along the recuperator tube to a discharge pipe 38 which communicates with an exhaust flue.

With the foregoing arrangement, gas flows to the burner head 30 through the gas supply pipe 27 while combustion air is supplied to the burner head via the annular passage 36 between the tubes 31 and 35. The gas and combustion air are mixed within the burner head and, as the mixture is discharged from the head, it is ignited by the spark electrode 33 so as to produce a flame. The flame shoots down the forward end of the recuperator tube 35 and serves to heat both that tube and the outer radiant tube 13. Products of combustion or exhaust gases discharged from the tube 35 are deflected by the closed end 14 of the radiant tube 13 and flow within the exhaust passage 37 and reversely along the tubes 13 and 35 to the exhaust line 38. During such flow, the exhaust gases effect further heating of the radiant tube 13 and, in addition, serve to preheat the combustion air flowing to the burner head 30 within the passage 36 and in a direction reverse to that of the exhaust gases. As is well known, preheating of the combustion air significantly increases the efficiency of the burner assembly 20.

Pursuant to one aspect of the invention, the burner head 30 is constructed in a novel manner to effect thorough mixing of the gas and the combustion air so as to produce uniform progressive combustion down the recuperator tube 35 and reduce the likelihood of hot spots in that tube and the radiant tube 13. Importantly, the construction of the burner head virtually eliminates the risk of the preheated combustion air prematurely cracking the gaseous fuel into carbon and causing clogging of the head.

More specifically, the burner head 30 includes a sleeve 40 which is fitted in close contact with the inner wall of the recuperator tube 35 and which defines a frustoconical throat 41 (FIG. 2) for contracting the fuel/air mixture as the mixture is discharged from the burner head. Herein, the sleeve is made of high grade stainless steel and its inner wall 42 tapers at an angle A of about 10 degrees as the wall progresses from the rear end of the sleeve toward the forward end thereof. The interior 41 of the sleeve thus defines a forwardly tapering frustum. The outer wall of the sleeve includes a cylindrical rear end portion 43 and, about midway along the length of the sleeve, the outer wall starts tapering forwardly at an angle B of about 15 degrees.

Closing the rear end portion of the sleeve 40 and extending perpendicular to the axis thereof is a circular plate 45 (FIG. 2) which, in this particular instance, is secured to the inner wall 42 of the sleeve by three welds 46 (FIG. 3) spaced angularly around the periphery of the plate. The spark rod 32 passes through a circular hole 48 in the plate. Six angularly spaced slots 50 are formed through the plate in order to enable combustion air to flow from the annular passage 36 into the sleeve 40. The slots extend generally radially from the periphery of the plate toward the center thereof but are formed by cutting through the plate 45 at an angle C (FIG. 3) of about 30 degrees relative to the axis of the plate. Thus, the angled side walls of the slots 50 cause the combustion air to spin or swirl as the air passes through the slots. Such swirling promotes thorough and vigorous mixing of the combustion air with the gas in the sleeve.

A tubular neck 52 (FIG. 2) is formed integrally with the central portion of the plate 45 and extends rearwardly therefrom. The forward end portion of the gas supply pipe 27 is threaded as indicated at 53 and is screwed into the neck. Gas from the pipe 27 flows into the neck and is discharged out of a fuel nozzle defined by three angularly spaced ports 55 (FIGS. 2 and 3), the ports exiting out of a small circular pad 56 on the forward side of the plate 45 at the center thereof.

Importantly, the gas discharge ports 55 are angled to shoot the gas outwardly into the converging, swirling stream of combustion air but, pursuant to the invention, the angled ports are directed more axially than radially in order to reduce clogging of the ports by carbon. For this purpose, each port is inclined such that the acute angle D (FIG. 2) between its axis and the axis of the sleeve 40 is significantly less than 45 degrees, the angle D herein being approximately 30 degrees. Because the direction of each port is more axial than radial, the ports shoot the gas axially away from the plate 45 so that the gas does not tend to lie back against the plate. This reduces the tendency of the preheated combustion air to crack the gas into carbon and helps avoid clogging of the ports 55. At the same time, the ports are angled sufficiently in a radial direction to promote good mixing of the gas with the combustion air.

In accordance with an important feature of the invention, the recuperator tube 35 is constructed of three separate sections 60, 61 and 62 (FIG. 1) to facilitate manufacture of the tube and assembly of the tube with the burner head 30 and also to facilitate repair of the tube. Specifically, the section 60 of the recuperator tube 35 is an upstream cylindrical section whose rear or upstream end is secured to the burner housing 21. The upstream section 60 is relatively long and its forward or upstream end is located about midway between the forward end of the inner tube 31 and the rear side of the burner head 30. Since the upstream section 60 is not subjected to intense heat, it may be economically made from relatively low grade stainless steel such as A.I.S.I. Type 310 steel having a composition of about 25 percent chromium and 20 percent nickel.

The section 61 of the recuperator tube 35 is a comparatively short intermediate section which is made of a higher grade, heat resistant stainless steel such as A.S.-S.I. Type 330 steel having a composition of about 18 percent chromium and 37 percent nickel. The inner diameter of the intermediate tube section 61 is machined to a precise roundness in order to establish a close face-to-face fit between the tube section 61 and the cylindrical portion 43 of the sleeve 40 around the entire periphery of the sleeve. The close fit prevents any substantial flow of combustion air between the sleeve 40 and the intermediate tube section 61 and forces the combustion air to flow into the sleeve through the passages 50 in the plate 45. Since the intermediate tube section 61 is of very short length, it is a relatively simple matter to machine the inner diameter of that tube section to a precise roundness to accommodate the sleeve 40. This eliminates the need of machining the entire length of the inner diameter of the long upstream tube section 60 and also enables that section to be made of low grade steel.

The rear end portion of the intermediate tube section 61 is of reduced outer diameter and is telescoped within and welded at 65 (FIG. 1) to the forward end portion of the upstream tube section 60. The burner head 30 is assembled with the tube sections 60 and 61 by inserting the head into the rear end of the upstream tube section 60 and by then slipping the head into the intermediate tube section 61. During assembly of the head, the tapered outer wall 44 of the sleeve 40 pilots the sleeve into the intermediate tube section 61 and insures against the head bottoming against and being stopped by the upstream end of the intermediate section.

Since the downstream tube section 62 is subjected directly to the intense heat of the flame, the tube section 62 is made of a relatively high grade stainless steel such as that sold under the trademark INCONEL ALLOY 600 and having a composition of about 15 percent chromium and 76 percent nickel. The forward end portion of the intermediate tube section 61 is of reduced diameter and is telescoped into the rear end of the downstream tube section 62 (see FIG. 1). The intermediate and downstream tube sections are tack welded together at three angularly spaced locations (one weld 66 being visible in FIG. 1) and, as a result, the downstream tube section 62 may be easily detached from the intermediate section 61 and replaced if the downstream section experiences burn out from the flame.

What is claimed:

1. A recuperative radiant tube heating system, said system comprising an outer radiant tube made of heat-resistant material and having a closed forward end, recuperator tube means located within said radiant tube and having an open forward end spaced upstream from the forward end of said radiant tube, an inner tube located within said recuperator tube means and having a forward end spaced upstream from the forward end of said recuperator tube means, a burner head located within said recuperator tube means between the forward end thereof and the forward end of said inner tube, and a gas supply pipe located within said inner tube for supplying gaseous fuel to said burner head, said inner tube being spaced radially inwardly from said recuperator tube means and coacting therewith to define an annular passage for the flow of combustion air to said burner head, said recuperator tube means being spaced radially inwardly from said radiant tube and coacting therewith to define an annular passage for the reverse flow of exhaust gases for preheating said combustion air prior to delivery of the combustion air to said burner head, said heating system being characterized in that said recuperator tube means comprise an upstream tubular section, an intermediate tubular section made of a more heat-resistant material than said upstream tubular section and secured thereto, and a downstream tubular section detachably secured to said intermediate tubular section, said burner head being located within said intermediate tubular section, said burner head comprising a sleeve formed separately of said intermediate tubular section and having an outer side disposed in close face-to-face engagement with the inner side of said intermediate tubular section around substantially the entire perihery of said sleeve, a portion of said sleeve having a cylindrical outer wall defining said outer side, the interior of said sleeve being frustoconical and tapering in diameter upon progressing forwardly, said burner head further including a plate extending perpendicular to the axis of said sleeve and closing the upstream end portion of said sleeve, a substantial portion of said sleeve extending downstream from said plate, and a series of angularly spaced passages formed through said plate and communicating with said intermediate tubular section to deliver combustion air into said sleeve.

2. A system as defined in claim 1 in which said sleeve includes a forwardly tapered frustoconical outer wall located forwardly of said cylindrical outer wall.

3. A system as defined in claim 1 in which the central portion of said plate includes a nozzle communicating with said gas supply line, said nozzle being formed with a series of angularly spaced gas ports which are inclined relative to the axis of said sleeve such that the acute angle between the axis of each port and the axis of said sleeve is substantially less than 45 degrees.

4. A system as defined in claim 1 in which said upstream and downstream tube sections are significantly longer than said intermediate tube section.

5. A system as defined in claim 4 in which said upstream tube section is made of a relatively low grade of stainless steel, said intermediate tube section being made of a higher grade of stainless steel, and said downstream tube section being made of a still higher grade of stainless steel.

* * * * *